United States Patent
van Vuuren et al.

(10) Patent No.: US 9,777,859 B2
(45) Date of Patent: Oct. 3, 2017

(54) PURGING AND SEALING-REDUCTANT DELIVERY UNIT FOR SELECTIVE CATALYTIC REDUCTION SYSTEMS

(71) Applicant: Continental Automotive Systems, Inc., Auburn Hills, MI (US)

(72) Inventors: Willem Nicolaas van Vuuren, Newport Newa, VA (US); Stephen C Bugos, Poquoson, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 183 days.

(21) Appl. No.: 13/680,438

(22) Filed: Nov. 19, 2012

(65) Prior Publication Data

US 2014/0138568 A1    May 22, 2014

(51) Int. Cl.
*F01N 3/20*    (2006.01)
*F16K 27/00*    (2006.01)

(52) U.S. Cl.
CPC ............ *F16K 27/00* (2013.01); *F01N 3/2066* (2013.01); *F01N 2610/02* (2013.01); *F01N 2610/1453* (2013.01); *F01N 2610/1493* (2013.01); *Y02T 10/24* (2013.01)

(58) Field of Classification Search
CPC ................ F16K 27/00; F02M 2200/16; F02M 2200/858; F02M 61/14; F01N 2610/1493; F01N 3/0211; F01N 2610/02; F01N 3/2066; Y02T 10/24
USPC ........ 251/148; 277/630, 637, 500, 435–438; 123/470

See application file for complete search history.

(56) References Cited

U.S. PATENT DOCUMENTS

| | | | | |
|---|---|---|---|---|
| 2,841,429 A | * | 7/1958 | McCuistion | F16J 15/3236 251/900 |
| 3,831,950 A | * | 8/1974 | Bentley | F16J 15/3236 277/649 |
| 4,181,010 A | * | 1/1980 | Knape et al. | 73/114.49 |

(Continued)

FOREIGN PATENT DOCUMENTS

CN    101539049 A    7/2013
WO    2009054865 A1    4/2009

OTHER PUBLICATIONS

English Translation of the State Intellectual Property Office of People's Republic China's First Office Action and Search Report, dated Sep. 22, 2015.

*Primary Examiner* — Kevin Murphy
*Assistant Examiner* — David Colon Morales

(57) ABSTRACT

A sealing device which is used as part of an injector in a reductant delivery unit (RDU), where the RDU is part of a selective catalytic reduction (SCR) system for injecting diesel exhaust fluid (DEF) into an exhaust system, used for controlling exhaust emissions. This invention improves the purging efficiency of the RDU, in addition to improving the sealing performance of the unit by reducing the fluid volume to be evacuated from the injector, and provides an additional sealing barrier to reduce the sealing load of the existing sealing elements. An additional sealing device having a ring seal and a stopper element (also referred to as a "plug") is pressed into the upper valve body of the injector, which results in a reduced fluid volume that is left behind after a purging event, due to the reduced initial volume at the beginning of the purge.

15 Claims, 2 Drawing Sheets

(56) References Cited

U.S. PATENT DOCUMENTS

| | | | | |
|---|---|---|---|---|
| 4,429,886 | A * | 2/1984 | Buttner | F16L 41/088 277/606 |
| 4,563,025 | A * | 1/1986 | Poe | F16L 23/20 277/614 |
| 4,572,515 | A * | 2/1986 | Grazioli | F16K 5/0673 251/317 |
| 4,711,397 | A * | 12/1987 | Lahiff | 239/125 |
| 5,002,290 | A * | 3/1991 | Pernin | F16J 15/024 277/649 |
| 5,129,658 | A * | 7/1992 | Berton et al. | 277/591 |
| 5,356,079 | A * | 10/1994 | Rahbar | 239/585.1 |
| 5,580,068 | A * | 12/1996 | Gundy | F16J 15/022 277/605 |
| 5,613,476 | A * | 3/1997 | Oi et al. | 123/509 |
| 5,724,946 | A * | 3/1998 | Franchitto | 123/470 |
| 5,771,689 | A * | 6/1998 | Bareis et al. | 60/286 |
| 6,082,333 | A * | 7/2000 | Vattelana | F02M 37/0017 123/456 |
| 6,149,163 | A * | 11/2000 | Brown | B64C 11/00 277/560 |
| 6,199,775 | B1 * | 3/2001 | Dallmeyer | F02M 37/22 123/470 |
| 6,328,232 | B1 * | 12/2001 | Haltiner et al. | 239/585.1 |
| 6,708,906 | B2 * | 3/2004 | Dallmeyer et al. | 239/585.1 |
| 6,718,949 | B2 * | 4/2004 | Gmelin | 123/470 |
| 6,877,484 | B2 * | 4/2005 | Reiter | 123/468 |
| 6,923,162 | B2 * | 8/2005 | Reiter | F02M 51/0682 123/468 |
| 7,128,055 | B2 * | 10/2006 | Zdroik | 123/470 |
| 7,195,004 | B2 * | 3/2007 | Scollard et al. | 123/470 |
| 7,293,549 | B2 * | 11/2007 | Kaishio | 123/469 |
| 7,422,160 | B2 * | 9/2008 | Dallmeyer | F02M 51/005 239/5 |
| 7,431,226 | B2 * | 10/2008 | Cho et al. | 239/585.1 |
| 7,458,530 | B2 * | 12/2008 | Morton | 239/585.5 |
| 7,617,991 | B2 * | 11/2009 | Wells et al. | 239/5 |
| 7,665,198 | B2 * | 2/2010 | Cho et al. | 29/407.05 |
| 8,002,287 | B2 * | 8/2011 | Wagner | 277/551 |
| 8,037,868 | B2 * | 10/2011 | Kannan et al. | 123/456 |
| 8,196,967 | B2 * | 6/2012 | Seifert | F16L 27/047 285/14 |
| 2005/0116056 | A1 * | 6/2005 | Hans et al. | 239/5 |
| 2005/0269426 | A1 * | 12/2005 | Cho | 239/533.2 |
| 2008/0012234 | A1 | 1/2008 | Wagner | |
| 2008/0216798 | A1 * | 9/2008 | Ghelardi | F02M 55/005 123/470 |
| 2008/0236147 | A1 * | 10/2008 | Van Vuuren | F01N 3/2066 60/295 |
| 2009/0107126 | A1 * | 4/2009 | Bugos | F01N 3/2066 60/301 |
| 2009/0315275 | A1 * | 12/2009 | Beele | 277/626 |
| 2010/0264231 | A1 * | 10/2010 | Di Domizio | F02M 55/02 239/5 |

* cited by examiner

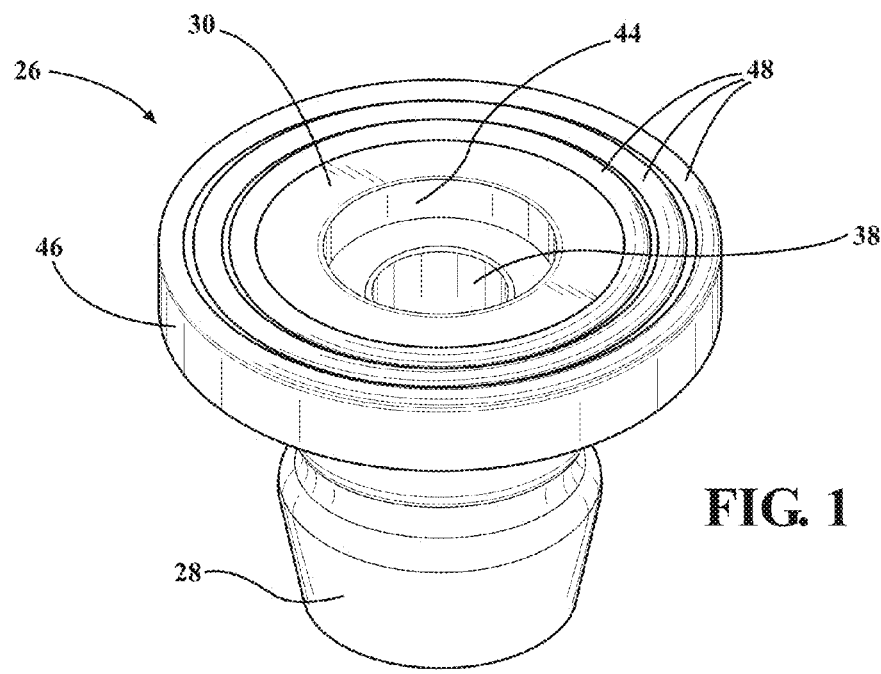
FIG. 1
FIG. 2
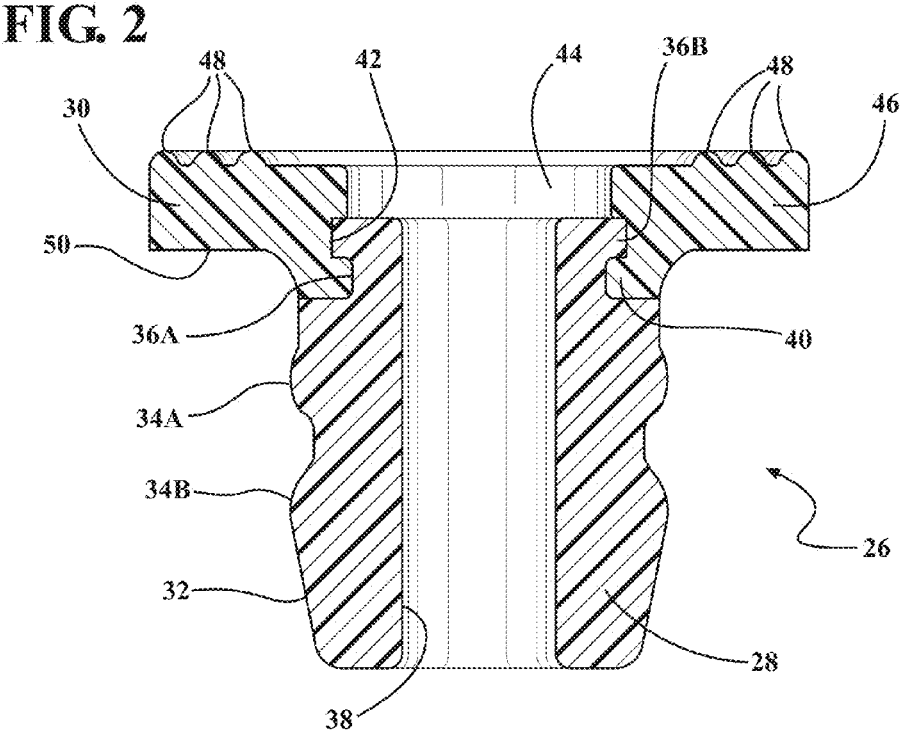

PURGING AND SEALING-REDUCTANT DELIVERY UNIT FOR SELECTIVE CATALYTIC REDUCTION SYSTEMS

FIELD OF THE INVENTION

The present invention relates generally to a sealing feature that is used as part of an injector for reducing the fluid volume to be evacuated from the injector, and to provide a sealing barrier to reduce the sealing load.

BACKGROUND OF THE INVENTION

New emissions legislation in Europe and North America is driving the implementation of new exhaust aftertreatment systems, particularly for lean-burn technologies such as compression-ignition (diesel) engines, and stratified-charge spark-ignited engines (usually with direct injection) that are operating under lean and ultra-lean conditions. Lean-burn engines exhibit high levels of nitrogen oxide emissions (NOx), that are difficult to treat in oxygen-rich exhaust environments characteristic of lean-burn combustion. Exhaust aftertreatment technologies are currently being developed that treat NOx under these conditions.

One of these technologies includes a catalyst that facilitates the reactions of ammonia ($NH_3$) with the exhaust nitrogen oxides (NOx) to produce nitrogen ($N_2$) and water ($H_2O$). This technology is referred to as Selective Catalytic Reduction (SCR). Ammonia is difficult to handle in its pure form in the automotive environment, therefore it is customary with these systems to use a liquid aqueous urea solution, typically at a 32% concentration of urea ($CO(NH_2)_2$). The solution is referred to as AUS-32, and is also known under its commercial name of AdBlue. The urea is delivered to the hot exhaust stream typically through the use of an injector, and is transformed into ammonia prior to entry in the catalyst. More specifically, the urea is delivered to the hot exhaust stream and is transformed into ammonia in the exhaust after undergoing thermolysis, or thermal decomposition, into ammonia and isocyanic acid (HNCO). The isocyanic acid then undergoes a hydrolysis with the water present in the exhaust and is transformed into ammonia and carbon dioxide ($CO_2$), the ammonia resulting from the thermolysis and the hydrolysis then undergoes a catalyzed reaction with the nitrogen oxides as described previously.

AUS-32, or AdBlue, has a freezing point of −11 C, and system freezing is expected to occur in cold climates. Since these fluids are aqueous, a volume expansion happens after the transition to the solid state upon freezing. This expanding ice can exert significant forces on any enclosed volumes, such as an injector, or fluid supply pipes. This expansion may cause damage to the injection unit, therefore, injection systems typically purge the injection unit when the engine shuts down to remove the fluid contained therein.

In the known system configurations, injector purging is accomplished by reversing the system pumping direction and drawing a vacuum on the system. The injector is opened during this condition, and exhaust gas is drawn through the injector thus displacing the fluid back to the fluid reservoir. It has been found that the efficiency of this method is not 100%, i.e. a certain amount of fluid remains in the injection unit. Although the amount of remaining fluid may not always be sufficient to risk damage to the injector upon freezing (expansion volume is available for the expanding ice), a risk remains that during engine hot soaks, the remaining fluid could be exposed to high temperature. This high temperature exposure could result in the decomposition of the AUS-32 which would also cause damage to the injection unit.

In other types of designs, it has been found that the remaining fluid tends to collect in the upper portion of the injector, in the volume between the filter and the inlet tube. Many types of injectors have O-rings which are used in combination with an injector cup to provide a sealing function, and prevent the remaining fluid from leaking. However, in some injectors, there is a potential leak path for the AUS-32 past the installed O-ring which cooperates with the injector cup to provide a sealing function. Although this sealing path created by the O-ring is typically sufficient for liquids, it has been found that AUS-32 solution is prone to breaching seals of this type in the form of creeping urea crystals. At the fluid boundary layer, if there has been a minimal bypass of the sealing joint, fluid evaporates and leaves behind urea in its solid form. This provides a wicking path for more liquid urea solution, which establishes another boundary layer, evaporates, and leaves behind more solid urea. This creeping mechanism has often been observed on AUS-32 systems.

Accordingly, there exists a need for an improved sealing mechanism which reduces the amount of fluid the O-ring is exposed to after the injector is purged.

SUMMARY OF THE INVENTION

The present invention is a sealing device which is used as part of an injector. The injector may be used as part of a reductant delivery unit (RDU), where the RDU is part of a selective catalytic reduction (SCR) system for injecting diesel exhaust fluid (DEF) into an exhaust system, which is used to control exhaust emissions.

The RDU delivers a reductant carrier (e.g. aqueous urea solution) to the engine exhaust system. The solution is transformed into ammonia which then reacts with the exhaust oxides of nitrogen in a catalytic environment to produce nitrogen and $H_2O$. One type of urea, commercially known as AdBlue, has a freezing point of −11° C. In order to prevent component damage during freezing conditions, AdBlue injection systems remove fluid from the injector by purging. This invention improves the purging efficiency of the RDU in addition to improving the sealing performance of the unit.

It is an object of this invention to reduce the fluid volume to be evacuated from the injector. It is another object of this invention to provide an additional sealing barrier to reduce the sealing load of the existing sealing elements. The feature consists of an additional sealing device having a stopper element (also referred to as a "plug") that is pressed into the upper valve body of the injector, and a ring seal. The injector is then installed into the injector cup ensuring that the ring seal of the sealing device is compressed between a flange portion formed as part of the upper valve body of the injector, and the injector cup.

The volume reduction is effected by the combined displacement of the stopper element and the ring seal. The ring seal is preferably of a compliant elastomeric material that resists exposure to AUS-32, such as ethylene propylene diene monomer (EPDM).

The volume reduction results in a reduced fluid volume that is left behind after a purging event, due to the reduced initial volume at the beginning of the purge. The ring seal provides an additional barrier to creeping urea. Any existing sealing elements, such as an O-ring, therefore only need to prevent breaching by creeping urea, and not pressurized fluid.

In one embodiment, the present invention is an injector having a sealing device, where the injector includes an upper valve body having a flange portion, and an O-ring surrounding and in contact with an outer surface of the upper valve body. The injector also includes a cap having a large diameter portion, a small diameter portion and a circumferential flange integrally formed together, where the large diameter portion of the cap substantially surrounds the O-ring such that an inner surface of the large diameter portion of the cap contacts the O-ring, at least partially compressing the O-ring, providing a sealing function between the O-ring and the large diameter portion of the cap and between the O-ring and the outer surface of the upper valve body.

The sealing device includes a stopper element having an aperture; a first rib and second rib are formed as part of the stopper element. The sealing device also includes a ring seal having a circumferential portion. The circumferential portion has a lower surface in contact with the flange portion of the upper valve body, and a plurality of ribs are formed as part of circumferential portion of the ring seal. Each of the plurality of ribs are in contact with an inner surface of the circumferential flange of the cap, and an aperture is formed as part of the circumferential portion.

The injector also includes an inlet, and an aperture formed as part of the inlet is substantially aligned with the aperture of the stopper element and the aperture of the ring seal, such that fluid is allowed to pass through the inlet, the stopper element, and the ring seal to pass through the valve body. Also formed as part of the inlet is a reduced diameter portion, the reduced diameter portion is received into and surrounded by the small diameter portion of the cap. Each of the plurality of ribs are in contact with the inner surface of the circumferential flange, and the lower surface of the circumferential portion of the ring seal is in contact with the flange portion to provide a sealing function, preventing the O-ring from being exposed to fluid during an SCR operation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective view of a sealing device used as part of an injector, according to embodiments of the present invention;

FIG. 2 is a sectional view of a sealing device used as part of an injector, according to embodiments of the present invention.

DETAILED DESCRIPTION OF THE PREFERRED EMBODIMENTS

Figure 3:
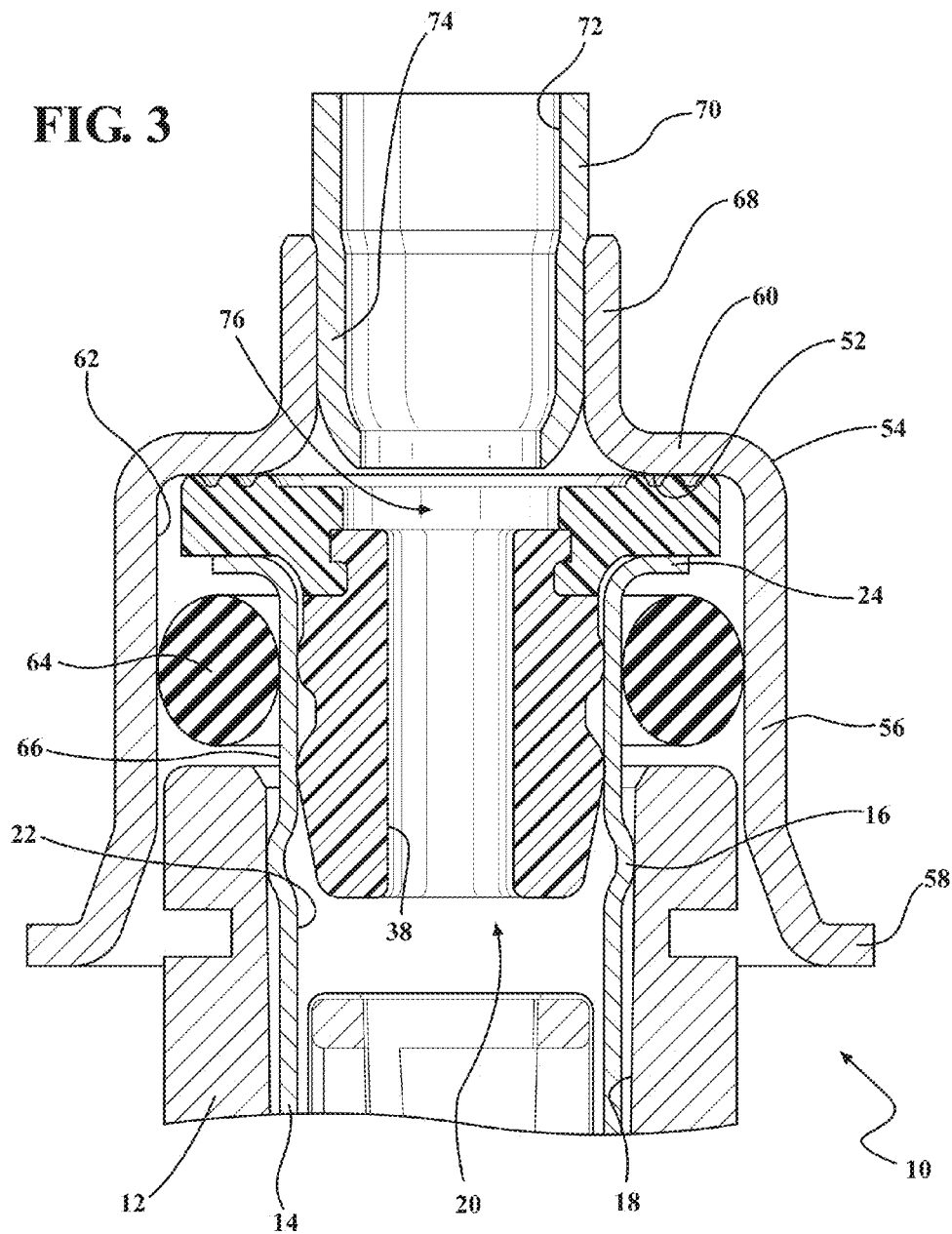
FIG. 3 is a partial sectional view of an injector having a sealing device, according to embodiments of the present invention.

The following description of the preferred embodiment(s) is merely exemplary in nature and is in no way intended to limit the invention, its application, or uses.

Referring now to the Figures generally, a portion of an injector having a seal device according to the present invention is shown generally at 10. The injector 10 includes a housing portion 12, which substantially surrounds an upper valve body 14. The housing portion 12 is hollow, and the upper valve body 14 has a notch 16 which is placed against the inner surface 18 of the housing portion 12, and connects the housing portion 12 and the valve body 14 through the use of an interference fit.

The upper valve body 14 is also hollow, and includes a cavity, shown generally at 20, and an inner surface 22. The upper valve body 14 also includes an upper flange 24, integrally formed as part of the upper valve body 14. Partially disposed in the cavity 20 is a sealing device, shown generally at 26. The sealing device 26 includes a first sealing portion 28, and a second sealing portion 30. In this embodiment, the first sealing portion 28 is a stopper element 28, and the second sealing portion 30 is a ring seal 30. In this embodiment, the ring seal 30 is made of a compliant elastomeric material that resists exposure to AUS-32, such as ethylene propylene diene monomer (EPDM), but it is within the scope of the invention that other materials which resist exposure to AUS-32 may be used as well.

The stopper element 28 includes an outer surface 32 having a plurality of ribs 34. More specifically, there is a first rib 34A and a second rib 34B. When the stopper element 28 is connected to the upper valve body 14, the ribs 34 contact the inner surface 22 of the upper valve body 14, forming an interference fit between the stopper element 28 and the upper valve body 14.

The stopper element 28 also includes a groove 36A, and a ridge 36B located next to the groove 36A. An aperture 38 is formed as part of the stopper element 28, through which diesel exhaust fluid (DEF) may pass. Connected to the stopper element 28 is the ring seal 30. The ring seal 30 includes a lip portion 40 which is received into the groove 36A. The ring seal 30 also includes a groove 42, and the ridge 36B is disposed in the groove 42 when the ring seal 30 is connected to the stopper element 38. An aperture 44 is also formed as part of the ring seal 30; the aperture 44 of the ring seal 30 is substantially concentric with the aperture 38, but the aperture 44 of the ring seal 30 has a larger diameter than the aperture 38 of the stopper element 28.

The ring seal 30 has a circumferential portion 46, and formed as part of the circumferential portion 46 are a plurality of ribs 48. When the ring seal 30 is connected to the stopper element 28, and the sealing device 26 is connected to the upper valve body 14, the lower surface 50 of the circumferential portion 46 contacts the upper flange 24. Additionally, the ribs 48 contact an inner surface 52 of a cap 54. The cap 54 includes a first diameter portion, which in this embodiment is a large diameter portion 56 having an outer flange 58. The large diameter portion 56 is integrally formed with a circumferential flange 60, where the inner surface 52 is formed as part of the circumferential flange 60. Contacting an inner surface 62 of the large diameter portion 56 is a sealing element, which in this embodiment is an O-ring 64, the O-ring 64 also in contact with an outer surface 66 of the upper valve body 14. The O-ring 64 is deformed when the cap 54 is pressed over the upper valve body 14 to provide a press-fit connection between the cap 54, the O-ring 64, and the upper valve body 14. The contact between the O-ring 64 and the upper valve body 14 provides a sealing function, and the contact between the O-ring 64 and the large diameter portion 56 provides a sealing function, which will be described later.

Also integrally formed with the circumferential flange 60 is a second diameter portion, which in this embodiment is a small diameter portion 68. At least partially disposed in the small diameter portion 68 is an inlet 70 having an aperture 72, through which diesel exhaust fluid passes. More specifically, the inlet 70 includes a reduced diameter portion 74 which is received into the inlet 70, and is connected to the inlet 70 through an interference fit. However, it is within the scope of the invention that instead of an interference fit, other types of connections may be used, such as a weld, a press fit, an adhesive, or combinations thereof.

A cavity, shown generally at 76, is formed from the connection between the cap 54, the inlet 70, and the O-ring 64. More specifically, the cavity 76 has fluid boundaries formed by the connection between the inlet 70 and the small diameter portion 68, and the sealing function achieved by the contact of the ribs 48 against the inner surface 52.

In operation, when the injector 10 is being used to deliver DEF to an exhaust system as part of an SCR operation, DEF passes through the inlet 70 and into the cavity 76, and then flows through the aperture 44 of the ring seal 30, and the aperture 38 of the stopper element 28. The fluid then flows through the upper valve body 14 and through the rest of the components of the injector 10. The DEF fluid flows under pressure, and the sealing device 26 is used to prevent, or at least minimize, the leakage of DEF and expose of the O-ring 64 to pressurized DEF. When the injector 10 is assembled, the cap 54 is pressed over the upper valve body 14, as stated above, to also apply pressure to the circumferential portion 46 such that pressure is applied to the ribs 48 by the inner surface 52 of the circumferential flange 60, and pressure is applied to the lower surface 50 of the circumferential portion 46 by the upper flange 24 of the upper valve body 14. The sealing function performed by the contact between the ribs 48 and the inner surface 52 and the sealing function performed by the contact between the lower surface 50 and the upper flange 24 limits the amount of fluid which may pass from the cavity 76 around the ribs 48, to limit the exposure of the O-ring 64 to the DEF, more specifically, pressurized DEF. When the SCR operation is finished, the injector 10 is purged to remove any fluid left in the injector 10.

The limitation of the O-ring 64 being exposed to DEF, minimizes the build-up of DEF around the O-ring 64 and along the inner surface 62 of the large diameter portion 56, when the DEF may be left behind after the injector 10 is purged. This works to prevent damage to the injector 10 from exposure to DEF, by preventing the build-up of urea crystals around the O-ring 64, the inner surface 62 of the large diameter portion 56, and the outer surface 66 of the upper valve body 14.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus comprising:
   an injector including:
   a valve body including a flange portion;
   a sealing element substantially surrounding the valve body;
   a cap located over the valve body such that a portion of the cap contacts the sealing element, the cap comprising a large diameter portion substantially surrounding the sealing element such that an inner surface of the large diameter portion is in contact with the sealing element; and
   a sealing device disposed between the valve body and the cap for substantially providing a sealing function between the cap and the valve body, the sealing device comprising:
   a stopper element received into a cavity formed as part of the valve body, the stopper element connecting the sealing device to the valve body; and
   a ring seal connected to the stopper element;
   wherein the ring seal is in contact with the cap and an upper surface of the flange portion of the valve body, providing the sealing function between the cap and the valve body, an outer radial surface of the ring seal being spaced, in a radial direction, a distance apart from an inner surface of the large diameter portion of the cap, the distance between the outer radial surface of the ring seal and the inner surface of the large diameter portion of the cap in the radial direction is less than a distance between a distal end of the flange portion of the valve body and the inner surface of the large diameter portion of the cap in the radial direction,
   the cap further comprises a circumferential flange integrally formed with the large diameter portion, a portion of the sealing device in contact with the circumferential flange when the cap is located over the valve body;
   the apparatus further comprises
   a small diameter portion integrally formed with the circumferential flange of the cap, the small diameter portion being part of the cap, and
   a separate inlet connected to the small diameter portion of the cap, such that fluid flows through the inlet and through the small diameter portion; and
   the inlet further comprises
   an aperture formed as part of the inlet substantially aligned with an aperture formed as part of the sealing device, such that fluid passes through the inlet, the stopper element, and the ring seal to pass through the valve body, and
   a first portion having a first outer diameter and a first inner diameter, and a second portion having a second outer diameter smaller than the first outer diameter and a second inner diameter, the second portion received into and surrounded by the small diameter portion of the cap and the first portion being disposed externally to the cap.

2. The apparatus of claim 1, the stopper element further comprising:
   a first rib formed as part of the stopper element; and
   a second rib formed as part of the stopper element in proximity to the first rib;
   wherein the first rib and the second rib are substantially in contact with an inner surface of the valve body, connecting the stopper element to the valve body, and the valve body includes a radially extending notch, the first and second ribs are disposed between the flange portion of the valve body and the radially extending notch.

3. The apparatus of claim 1, the ring seal further comprising:
   a circumferential portion having a lower surface in contact with the flange portion of the valve body; and
   a plurality of ribs formed as part of the circumferential portion, each of the plurality of ribs in contact with an inner surface of the cap, the plurality of ribs comprising annular ribs concentric with each other;

wherein each of the plurality of ribs provides the sealing function between the cap and the valve body.

4. The apparatus of claim 3, wherein the lower surface of the circumferential portion is in contact with the flange portion.

5. The apparatus of claim 1, further comprising:
a groove formed as part of the stopper element;
a ridge formed as part of the stopper element in proximity to the groove formed as part of the stopper element;
a lip portion formed as part of the ring seal; and
a groove formed as part of the ring seal in proximity to the lip portion formed as part of the ring seal;
wherein the lip portion is disposed in the groove formed as part of the stopper element and the ridge is disposed in the groove formed as part of the ring seal when the stopper element is connected to the ring seal.

6. The apparatus of claim 1, wherein the sealing element is an O-ring.

7. The apparatus of claim 1, the ring seal forming a ring seal aperture through the ring seal and the stopper element forming a stopper aperture through the stopper element, the ring seal aperture and the stopper aperture combining to form the aperture formed as part of the sealing device, the ring seal aperture having a larger diameter than the stopper aperture.

8. An injector having a sealing device, comprising:
an upper valve body having a flange portion;
an O-ring substantially surrounding an outer surface of the upper valve body;
a cap located over the upper valve body such that a portion of the cap contacts the O-ring providing a sealing function between the cap and the upper valve body;
a stopper element partially disposed in a cavity formed as part of the upper valve body; and
a ring seal connected to the stopper element;
wherein the ring seal is at least partially positioned between the flange portion and the cap, providing a sealing function between the flange portion and the cap, the cap comprising a large diameter portion substantially surrounding the O-ring such that an inner surface of the large diameter portion is in contact with the O-ring, the ring seal including an outer radial surface being spaced a distance apart from the inner surface of the large diameter portion of the cap, and
the ring seal comprises:
a circumferential portion having a lower surface in contact with the flange portion of the upper valve body; and
a plurality of ribs formed as part of the circumferential portion, each of the plurality of ribs in contact with an inner surface of the cap, the plurality of ribs comprising annular ribs concentric with each other;
wherein each of the plurality of ribs provides the sealing function between the cap and the upper valve body,
the cap comprises a small diameter portion and a circumferential flange integrally formed with the small diameter portion, a portion of the ring seal in contact with the circumferential flange when the cap is located over the valve body, the large diameter portion being integrally formed with the circumferential flange; and
the injector further comprises:
a separate inlet connected to the small diameter portion;
an aperture formed as part of the inlet substantially aligned with an aperture formed as part of the stopper element and an aperture formed as part of the ring seal, such that fluid is allowed to pass through the inlet, the stopper element, and the ring seal to pass through the valve body; and
a first inlet portion formed as part of the inlet and having a first outer diameter and a first inner diameter, and a second portion formed as part of the inlet and having a second outer diameter smaller than the first outer diameter and a second inner diameter, the second inlet portion received into and surrounded by the small diameter portion of the cap and the first portion being disposed externally to the cap.

9. The injector having a sealing device of claim 8, the stopper element further comprising:
a first rib disposed in the cavity and in contact with an inner surface of the upper valve body; and
a second rib disposed in the cavity and in contact with the inner surface of the upper valve body;
wherein a force is applied to the first rib and the second rib by the inner surface of the upper valve body, securing the stopper element to the upper valve body, the upper valve body includes a radially extending notch, and the first and second ribs are disposed between the flange portion of the valve body and the radially extending notch.

10. The injector having a sealing device of claim 8, further comprising:
a groove formed as part of the stopper element;
a ridge formed as part of the stopper element in proximity to the groove formed as part of the stopper element;
a lip portion formed as part of the ring seal; and
a groove formed as part of the ring seal in proximity to the lip portion formed as part of the ring seal;
wherein the lip portion is disposed in the groove formed as part of the stopper element and the ridge is disposed in the groove formed as part of the ring seal when the stopper element is connected to the ring seal.

11. The injector having a sealing device of claim 8, the aperture formed as part of the ring seal having a larger diameter than the aperture formed as part of the stopper element.

12. The injector of claim 8, where the distance between the outer radial surface of the ring seal and the inner surface of the large diameter portion of the cap, in a radial direction of the ring seal, is less than a distance between a distal end of the flange portion of the valve body and the inner surface of the large diameter portion of the cap in the radial direction.

13. An injector having a sealing device, comprising;
an upper valve body having a flange portion;
an O-ring surrounding and in contact with an outer surface of the upper valve body;
a cap having a large diameter portion, a small diameter portion and a circumferential flange integrally formed together, the large diameter portion of the cap substantially surrounds the O-ring such that an inner surface of the large diameter portion of the cap contacts the O-ring, at least partially compressing the O-ring, providing a sealing function between the O-ring and the large diameter portion of the cap and between the O-ring and the outer surface of the upper valve body;
a stopper element having an aperture;
a first rib formed as part of the stopper element;
a second rib formed as part of the stopper element in proximity to the first rib, the first and second ribs contacting an inner surface of the upper valve body;
a ring seal;

a circumferential portion formed as part of the ring seal, the circumferential portion having a lower surface in contact with the flange portion of the upper valve body;

a plurality of ribs formed as part of the circumferential portion of the ring seal, each of the plurality of ribs in contact with an inner surface of the circumferential flange of the cap, the plurality of ribs formed as part of the circumferential portion of the ring seal comprising concentric annular ribs;

an aperture formed as part of the ring seal;

a separate inlet piece;

an aperture formed as part of the inlet piece substantially aligned with the aperture of the stopper element and the aperture of the ring seal, such that fluid passes through the inlet piece, the stopper element, and the ring seal to pass through the valve body; and a first inlet portion formed as part of the inlet piece having a first outer diameter and a first inner diameter, and a second inlet portion formed as part of the inlet piece having a second outer diameter smaller than the first outer diameter and a second inner diameter, the second inlet portion received into and surrounded by the small diameter portion of the cap and the first inlet portion disposed external to the cap;

wherein each of the plurality of ribs in contact with the inner surface of the circumferential flange and the lower surface of the circumferential portion of the ring seal in contact with the flange portion provides a sealing function.

14. The injector having a sealing device of claim 13, further comprising:

a groove formed as part of the stopper element;

a ridge formed as part of the stopper element in proximity to the groove formed as part of the stopper element;

a lip portion formed as part of the ring seal; and a groove formed as part of the ring seal in proximity to the lip portion formed as part of the ring seal;

wherein the lip portion is disposed in the groove formed as part of the stopper element and the ridge is disposed in the groove formed as part of the ring seal when the stopper element is connected to the ring seal.

15. The injector having a sealing device of claim 13, the aperture formed as part of the ring seal having a larger diameter than the aperture of the stopper element.

* * * * *